United States Patent [19]

Davis, Jr.

[11] 4,202,534
[45] May 13, 1980

[54] METHOD AND APPARATUS FOR PRODUCING METALLIZED IRON ORE

[75] Inventor: William L. Davis, Jr., Salt Lake City, Utah

[73] Assignee: HICAP Engineering & Development Corp., Salt Lake City, Utah

[21] Appl. No.: 899,318

[22] Filed: Apr. 24, 1978

[51] Int. Cl.² ............................................. C22B 1/10
[52] U.S. Cl. ...................................... 266/172; 75/26; 266/157
[58] Field of Search .................... 266/157, 172; 75/26

[56] References Cited

U.S. PATENT DOCUMENTS

| | | | |
|---|---|---|---|
| 3,228,669 | 1/1966 | Old | 75/26 |
| 3,246,978 | 4/1966 | Porter | 75/26 |
| 3,257,198 | 6/1966 | Volk | 75/26 |
| 3,295,956 | 1/1967 | Whaley | 75/26 |

*Primary Examiner*—P.D. Rosenberg
*Attorney, Agent, or Firm*—M. Reid Russell

[57] ABSTRACT

An apparatus and process for producing metallized iron ore by direct reduction techniques for use in iron and steelmaking furnaces, the apparatus and process first involving separation and treatment of run-of-mine iron ore to produce controlled and optimum size fractions for reduction and metallization in suitable direct reduction systems. The apparatus and process further involves a particular size fraction entering a series of staged fluidized bed reduction systems, each system provided with auxiliary ore feeding and preheating facilities, and with the process provided with a single source of, or production facilities for, high-temperature reducing gases which effect reduction to desired high degrees of metallization. The apparatus and process provides for essentially a complete utilization of reducing gases and for enhanced incremental scaleup capabilities to a single-line plant for the production of metallized iron ore.

34 Claims, 11 Drawing Figures

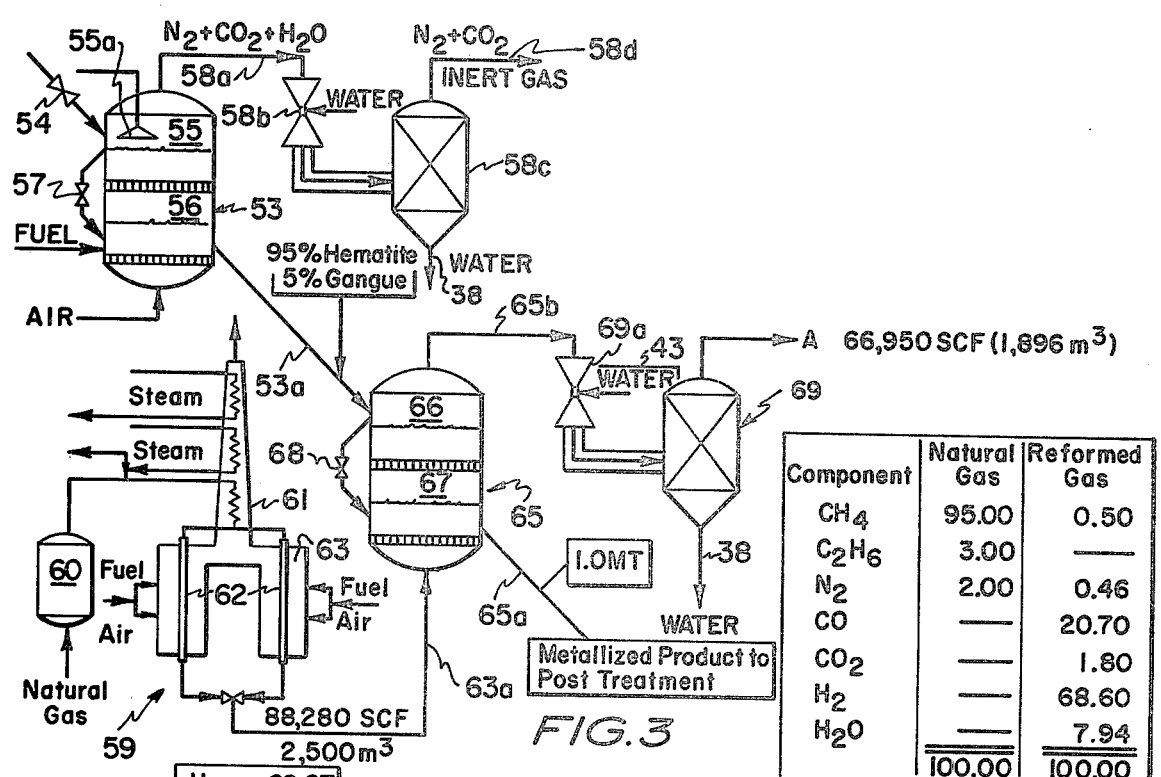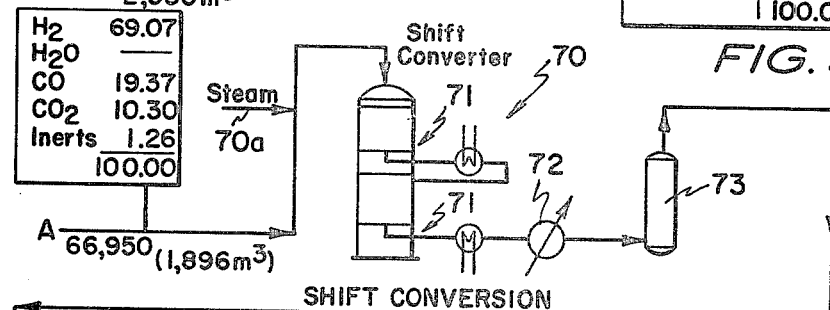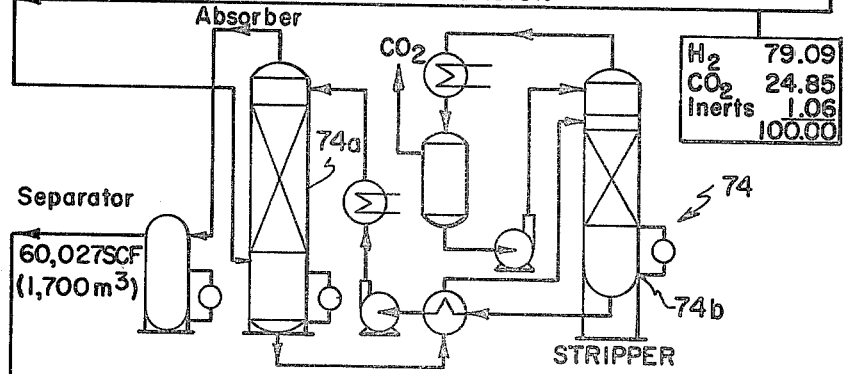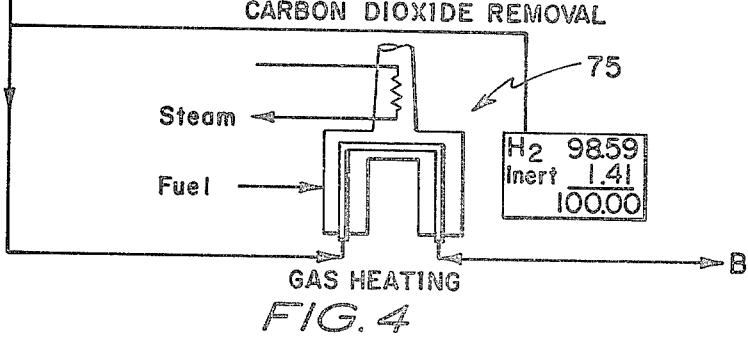

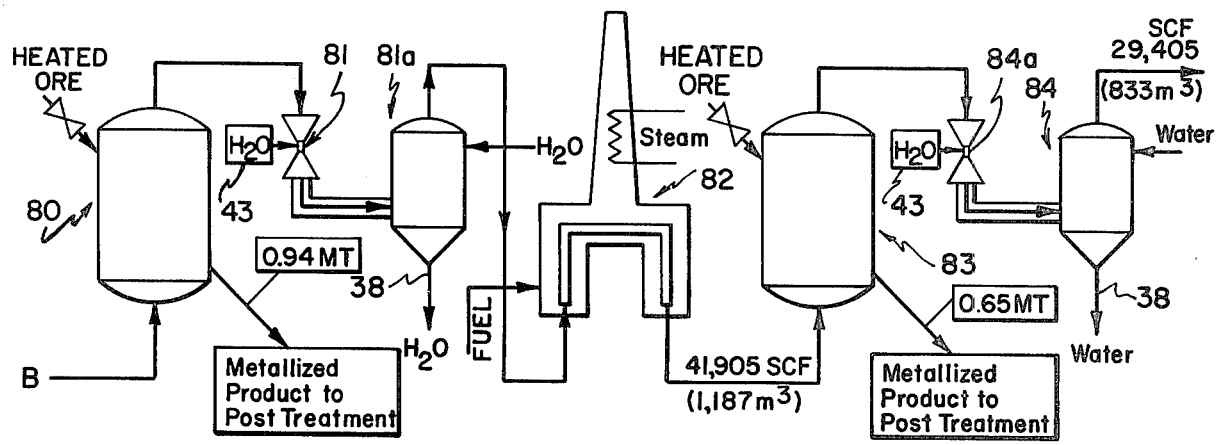
FIG.5
| | NET REDUCING GAS | INDIVIDUAL SYSTEM GAS UTILIZATION,% | TOTAL SYSTEMS GAS UTILIZATION,% | SYSTEM PRODUCTIVITY | TOTAL SYSTEMS PRODUCTIVITY |
|---|---|---|---|---|---|
| FIRST SYSTEM | 100.0 | 24.89 | 24.89 | 1.00 | 1.00 |
| SECOND SYSTEM | 75.10 | 30.61 | 47.88 | 0.94 | 1.94 |
| THIRD SYSTEM | 52.12 | 30.43 | 63.74 | 0.65 | 2.59 |
FIG.5a
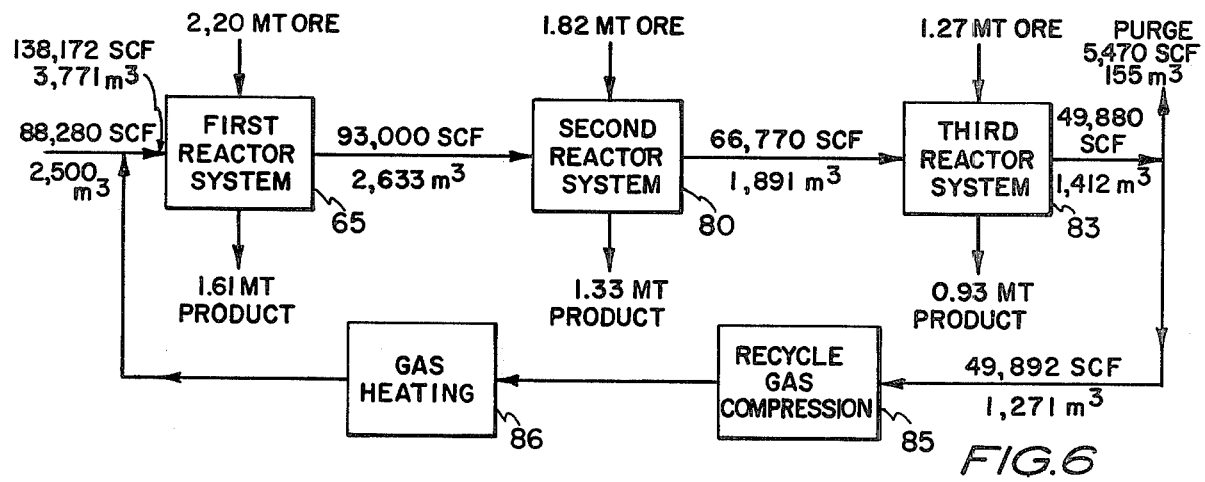
FIG.6
| | NET REDUCING GAS | TOTAL SYSTEMS GAS UTILIZATION % | SYSTEM PRODUCTIVITY | TOTAL SYSTEMS PRODUCTIVITY |
|---|---|---|---|---|
| FIRST SYSTEM | 100.00 | 41.86 | 1.61 | 1.61 |
| SECOND SYSTEM | 58.54 | 72.93 | 1.33 | 2.94 |
| THIRD SYSTEM | 27.05 | 94.76 | 0.93 | 3.87 |
FIG.6a

METHOD AND APPARATUS FOR PRODUCING METALLIZED IRON ORE

BACKGROUND OF THE INVENTION

FIELD OF THE INVENTION

This invention relates to methods and apparatus for producing metallized iron ore for use in iron and steel-making furnaces from run-of-mine iron ore employing fluidized bed technology in combination with other technologies involving primarily mineral dressing, reducing gas production and purification, and other technologies for direct reduction of iron ore and iron making.

HISTORY OF THE INVENTION

The annual world's direct reduction capacity by all processes in 1970 was less than three million tonnes, but in 1977 it had risen to 15 million tonnes. Over 30 million tonnes are indicated in 1980, and, by the end of the century with the world's steel capacity projected to be one billion tonnes, direct reduction will account for some 100 million tonnes. A current update with projections is presented by Miller, J. R., "Global Status of Direct Reduction-1977," Iron and Steel Engineer, September 1977.

Many reasons, both technical and economic, exist for this impressive growth, which largely has occurred in developing nations rather than in the industrialized nations. The three most significant reasons are first that direct reduction lends itself to limited production of metallized iron ore at moderate investments, in contrast to the massive capital outlays required for construction and operation of a modern blast furnace plant and related facilities such as facilities for coke production. Secondly, direct reduction can employ energy and fuels for ore reduction, such as natural gas, oil, and non-coking coals, that can be used in only very limited quantities in the iron blast furnace process. Thirdly, melting and refining to steel of iron produced by direct reduction is readily accomplished in electric furnaces at moderate costs, in contrast to massive open-hearth or basic-oxygen steelmaking shops required for refining blast furnace molten pig iron or hot metal. Therefore, for a country having either or both iron ores and fuel and energy supplies suitable for direct reduction, direct reduction plants are ideal for providing that country with the basis for an iron and steel industry at minimal costs. In industrialized countries direct reduction plants have been constructed and are in operation but growth has been hampered by fuel and energy shortages, particularly natural gas, from which reducing gases can be produced. However, as reserves of coal suitable for coke manufacturing for use in blast furnaces diminish, the development of coal gasification processes that utilize non-coking coals for producing reducing gases will provide incentives for further applications of direct reduction. Other trends are occurring in which oil and natural gas rich nations that are deficient in iron ore are constructing direct reduction plants to metallize imported iron ore for domestic use and for export to world markets.

PRIOR ART

The accepted definition of direct reduction applies to processes in which reduction and resulting metallization of iron oxide ores occurs below melting temperatures and the product is in a solid form. This characterizes direct reduction from other processes such as a blast furnace in which melting temperatures are attained and the products are molten slag and molten pig iron, usually called hot metal.

Direct reduction was practiced in early antiquity with small charcoal ovens wherein iron oxides were reduced to a spongy metallic mass. It was from such practices that the generic term "sponge iron" was derived, which term is still applied although the products from most modern direct reduction processes seldom have appearances suggested by this term. However, direct reduction was less and less practiced after advent and development of the blast furnace process until very recently when it has reappeared as a viable production means. A major reason, in addition to those previously cited for this resurgance is that a variety of excellent processes have been developed and commercialized. These processes can generally be classified into four types of reactor systems, with sub-classifications thereof based upon the required physical form of the iron ore feed, upon the type of reducing agent employed, and upon the physical form of the metallized product.

One such reactor system employs a moving-bed shaft furnace reactor that uses iron ore agglomerates as the feed material, such as either lump ore or pellets made from fine ore or mixtures. A preferred reducing agent for this system is gaseous mixtures of mainly hydrogen ($H_2$) and carbon monoxide (CO) commonly produced by steam reforming of natural gas. Metallized product from this system is as agglomerates except for a generally small proportion of fine material that may have been created within the reactor. An example of one such system is described by Schroer, C. A., and Clark, D. W., "Operating a Midrex Direct Reduction Plant-Current State of the Art," Iron and Steel Engineer, August 1976. Another such system is described by Crestani, A. B., et al, "Direct Reduction Process for Electric Furnace Steelmaking at Armco," Industrial Heating, September 1974. Still another such system is described by Pantke, H. D., "Proceso Purofer," Reduccion Directa en America Latina published by ILAFA (Latin America Iron and Steel Institute) in 1974.

Another system, a fixed-bed shaft furnace reactor also uses agglomerates as the feed material, with gaseous reducing agents, and the metallized product is agglomerates. An example of such system is described by Gearhart, H. E. and Jackson, K. A., "Production of Metallized Pellets by the HyL Process," Iron and Steel Engineer, March 1971.

A third of the four systems involves a rotary kiln reactor that also uses agglomerates as the ore feed material with the product therefrom appearing as metallized agglomerates. The reducing agent is preferably solid carbonaceous materials, such as low-volatile and non-coking coals, and is often augmented by natural gas or fuel oil. Two examples of this system are shown in Reuter, G., "Proceso SL/RN," and Krebs, E., "Proceso Krupp," both in Reduccion Directa en America Latina published by ILAFA in 1974. Another example is given by Albert, A. A., "Development of the Accar Process at Allis-Chalmers," published by the Allis-Chalmers Corporation in 1977.

A fourth system utilizes fluidized bed reactors that handle an iron ore feed of fine solids rather than as agglomerates. Preferred gaseous reducing agents for this system are preferably produced by steam reforming of natural gas. The product from such system appears as metallized fines and, except for the process of the present invention, other existing processes practice high-temperature briquetting of that product to convert it into metallized agglomerates. One example of such system is provided by Oehlberg, R. J., "FIOR Process for Direct Reduction of Iron Ore," Iron and Steel Engineer, April 1974. Another such system is described by Agarwal, J. C., et al, "The Nu-Iron Process," Journal of Metals, Vol. 12 (1960), No. 4. Still another such system is presented by Davis, W. L., Jr., et al, "Briquetacion del Mineral de Hierro de Alto Tenor de Reduccion Directa en Lechos Fluidizados," in Reduccion Directa en America Latina published by ILAFA in 1974.

While the various direct reduction processes have many individual advantages over blast furnace processes as discussed, significant problems exist with each. One common problem is the requirement that iron ore feed be of a particular size or size range for a particular system, whereas run-of-mine iron ore contains all sizes. Thus, for reactors requiring agglomerates, as only a relatively small portion of ores occur as natural lump material, complex and expensive ore preparation plants are needed to pelletize and indurate fine ores, and the investment for such facilities is an appreciable part of such a complete direct reduction plant. Fluidized bed reactors can apparently employ less costly ore preparation plants as they utilize fine ores as the feed material. However, substantial quantities of extremely fine particles occur in all run-of-mine ores, and, when these are included in the feed to such a reactor, the consequences are very serious with respect to operating problems, requiring additional and costly equipment. Heretofore, such consequences have not been recognized by those skilled in the design and operation of fluidized bed reactor systems.

Another problem with existing direct reduction technology the present invention improves upon concerns the heretofore lack of incremental scaleup capability in which units of productive capacity are added to the same single-line plant. Without such capability if, for example, it is desired to double a plant's capacity a costly new plant must be constructed in contrast to the less costly addition of a productive unit to the same plant as taught by the present invention.

Another problem with existing direct reduction technology improved upon by the present invention involves the inherent thermodynamic and kinetic constraints on reducing iron oxides. Namely, at practical operating temperatures substantially above 1000° F. (538° C.), only about 25 to 35 percent of reducing gases such as $H_2$ and $CO$ will be converted to water vapor and carbon dioxide, metallizing the ore, during a single pass through a reactor. Thus, approximately two-thirds of such gases will emerge unchanged. Prior art solutions to this problem of low reducing gas utilization, as in the cited reference by Davis, have involved using the reactor off gas by burning it for process heat. Or, as in the cited references by Oehlberg and Agarwal, additional gas utilization for ore reduction has been obtained by gas treatment and water vapor removal from such off gas and then recycling it to the reactor along with a makeup gas. This procedure, however, requires that about two units of the off gas be treated and re-compressed for recycling for each unit of makeup gas. The effect of this procedure is that of requiring a smaller facility for reducing gas production, but does not provide for increases in productive capacity. Moreover, facilities for large recycle ratios are necessarily very expensive to construct and operate, and this factor largely offsets the economies of a smaller facility for reducing gas production. The present invention provides improved off gas handling techniques in addition to series reactors providing, thereby, for up to a 100% gas utilization and as much as a 200 to 300 percent production increase.

Within the knowledge of the inventor there has not heretofore existed an arrangement of apparatus like that of the present invention, nor a process for its use, and the present invention is therefore believed to be both novel and unique.

SUMMARY OF THE INVENTION

It is a principle object of the present invention to provide improved mineral dressing apparatus and procedures for preparing run-of-mine iron ore in which that ore is selectively sized to furnish optimum feed sizes for direct reduction processing.

Another object is to provide apparatus and a method for its use in direct reduction processing of iron ore employing reducing gas production and purification technology whereby thermodynamic and kinetic constraints of iron ore reduction and metallization are minimized such that more efficient and complete utilization of reducing gases are achieved on a single-pass basis than has heretofore been possible.

Another object is to provide apparatus and a method for its use to achieve essentially a complete utilization of reducing gases for iron ore reduction with facilities of minimum size and expense for the recycling of off gases from the direct reduction process achieving up to one hundred percent reducing gas utilization.

Another object is to provide apparatus and a method for its use whereby a direct reduction operation can be incrementally scaled up, units of productive capacity being added to the same single-line plant, each added unit generally becoming progressively less complex and less expensive in capital and operating expense than that unit preceeding, and, thus, eliminating the need for completely separate facilities when future capacity additions are needed.

Another object is to provide apparatus and a method for its use for adding incremental scaleup capability to a direct reduction process with only a single source of or facilities for reducing gas production, such that added units of productive capacity do not each require their own individual source of or facilities for the production of reducing gases, with added units independent of additional sources of feedstock fuels for the production of reducing gases.

Still another object is to provide apparatus and a method for its use that will enable substantial increases in operating temperatures for ore reduction and metallization in a direct reduction process, which increases in temperature will increase the rates of chemical reaction and the degree of reducing gas utilization, thereby decreasing the quantities of reducing gases required per unit of metallized iron ore and the retention time of iron ore that is required to be in contact with reducing gases to achieve a desired metallization.

Still another object is to provide apparatus and a method for its use for supplying an increased flow of reducing gases in a direct reduction process in relation to iron ore being processed increasing thereby the production of metallized iron ore with decreased gas production expense.

Still another object is to provide apparatus and a method for its use for minimizing compression and recompression of reducing gases in a direct reduction process by the staging of direct reduction reactors each operating at a pressure lower than the one before, reducing thereby the size and expense of compressor units needed for use in the facility.

Still another object is to provide apparatus and a method for its use for generating, in a direct reduction process, sufficient inert gases for in-plant purposes including metallized iron ore post-treatment, thereby eliminating the need for expensive auxiliary equipment for this purpose.

Still another object of the present invention is to provide apparatus and a method for its use compatible with existing fluidized bed and other direct reduction reactor operations, and with commonly practiced mineral dressing and ore preparation and processing techniques, as well as with conventional reducing gas production and purification procedures, the apparatus and method for its use of the present invention being useful for increasing production of such existing facility with minimum facilities and equipment additions thereto.

The present invention in an apparatus and a method for its use in the direct reduction of iron ore to produce metallized iron ore suitable for use in iron and steelmaking furnaces involves first treating run-of-mine iron ore by conventional physical mineral processing and mineral dressing procedures. Separating thereby that ore into three controlled size fractions consisting of, lump ores, a mid-size fraction and a fine-size fraction. Such fine-size fraction is then pelletized and indurated to produce strong fired oxide pellets for combination with natural lump ore fractions for reduction and metallization in a suitable direct reduction system or conventional ironmaking system designed for processing such agglomerates.

The present invention includes apparatus for moving mid-size ore fraction, by wet or dry feed methods, into a direct reduction system that employs fluidized beds suitable for handling such ore sizes. Such system preferrably consists of a first pressurized fluidized bed reduction system having associated therewith facilities that produce inert gases, and a source of high temperature reducing gases, predominently hydrogen ($H_2$). Such first fluidized bed reduction system preferably consists of two reactors, each arranged for continuous high temperature countercurrent reducing gas to solids contact and provides for sufficient retention time of the ore and gas to effect up to 95 percent metallization of mid-size ore. Off gas from said first reduction system is scrubbed to remove dust and water vapor, and its hydrogen content is enhanced by passing it through a gas purification facility. Such gas purification facility effects a gas shift conversion, carbon monoxide ($CO$) being converted to carbon dioxide ($CO_2$) that is then removed, along with water, off gas therefrom consisting of nearly pure hydrogen ($H_2$). That gas, after heating only, then is suitable as a high temperature reducing gas for passage through a second fluidized bed reduction system that, like the first reduction system, preferably consists of two reactors with associated facilities that operate like the first reduction system, at a lower pressure, achieving like ore metallization to, and approximately 70 to 95 percent of the production of, the first fluidized bed reduction system. Thereafter the off gas from this second fluidized bed reduction system is again scrubbed, removing dust and water vapor, and then is preferably a source of high temperature reducing gas for passage through a third or additional fluidized bed reduction systems with associated facilities. Each such system operates at a lower pressure and productive output from the system preceeding, a third such system producing approximately 50 to 65 percent of that amount and degree of metallization produced in the first fluidized bed reduction system. The off gas from the third reduction system can then be burned for plant heating purposes but is preferably recycled after scrubbing and heating into the inlet gas to the first reduction system to achieve additional metallized iron ore capacity, thereby fully utilizing the capabilities of the reducing gas for ore reduction with minimal reprocessing.

The stagewise construction and operation of the apparatus of the present invention provides over a 100 percent increase in utilization of reducing gases enhanced from the gas utilization of a single reduction system on a one-pass basis and provides for a corresponding scaleup of metallized ore production. Further, the employment of recycling of the off gas from the third reduction system provides for essentially a complete reducing gas utilization and for scaleup of metallized ore production of over 200 percent as compared to the single reduction system.

Further objects and features of the apparatus of the present invention and method for its use will become more apparent from the following detailed description taken together with the accompanying drawings.

THE DRAWINGS

FIG. 1, is a block flow chart showing run-of-mine iron ore sized for handling in a hybrid refining operation;

FIG. 2, a schematic flow showing run-of-mine ore being sized with the ore defined as mid-size shown moving into an ore heater of a fluidized bed facility;

FIG. 3, a schematic of an ore heater and a first reactor system of the present invention showing a sample relationship of reformed gas, entering that first reactor system to off-gas therefrom;

FIG. 3(a), a chart showing the natural gas constituents by percentage, and the gases, by percentage, passed from the reformer of FIG. 3;

FIG. 4, a schematic of a shift conversion facility for processing off-gas passing from the first reactor system of FIG. 3, showing the sample gas volume and constituents thereof by percentage;

FIG. 5, a schematic of second and third reactor systems receiving sized ore with off-gas from the first reactor system, after shift conversion, introduced into that second reactor system passing therefrom, after scrubbing, through a heating facility and into the third reactor system, showing a continuation of the sample gas volume as that gas is used up in metallizing the iron ore;

FIG. 5(a), a chart showing the reducing gas utilization in each of the three reactor systems and the percentage production of metallized ore therefrom as relating to the first reactor system;

FIG. 6, a block flow chart showing the three reactor systems connected to an off-gas recycling system that heats and feeds reprocessed off-gas into the reducing gas flow into the first reactor;

FIG. 6(a), a chart showing percentage of gas utilized and systems productivity for the three reactor systems of FIG. 6;

FIG. 7, a chart like that of FIG. 6 only showing a gas shift converter and $CO_2$ scrubber like that shown in FIG. 4, with the product therefrom flowing into first reactor system as the reducing gas flow; and FIG. 8, a fluidized bed product cooler showing receipt of hot metallized ore from the reactor systems utilizing inert gas from the ore heaters of FIG. 3, to stabilize the product for storage or transport.

DETAILED DESCRIPTION

Figure 1:
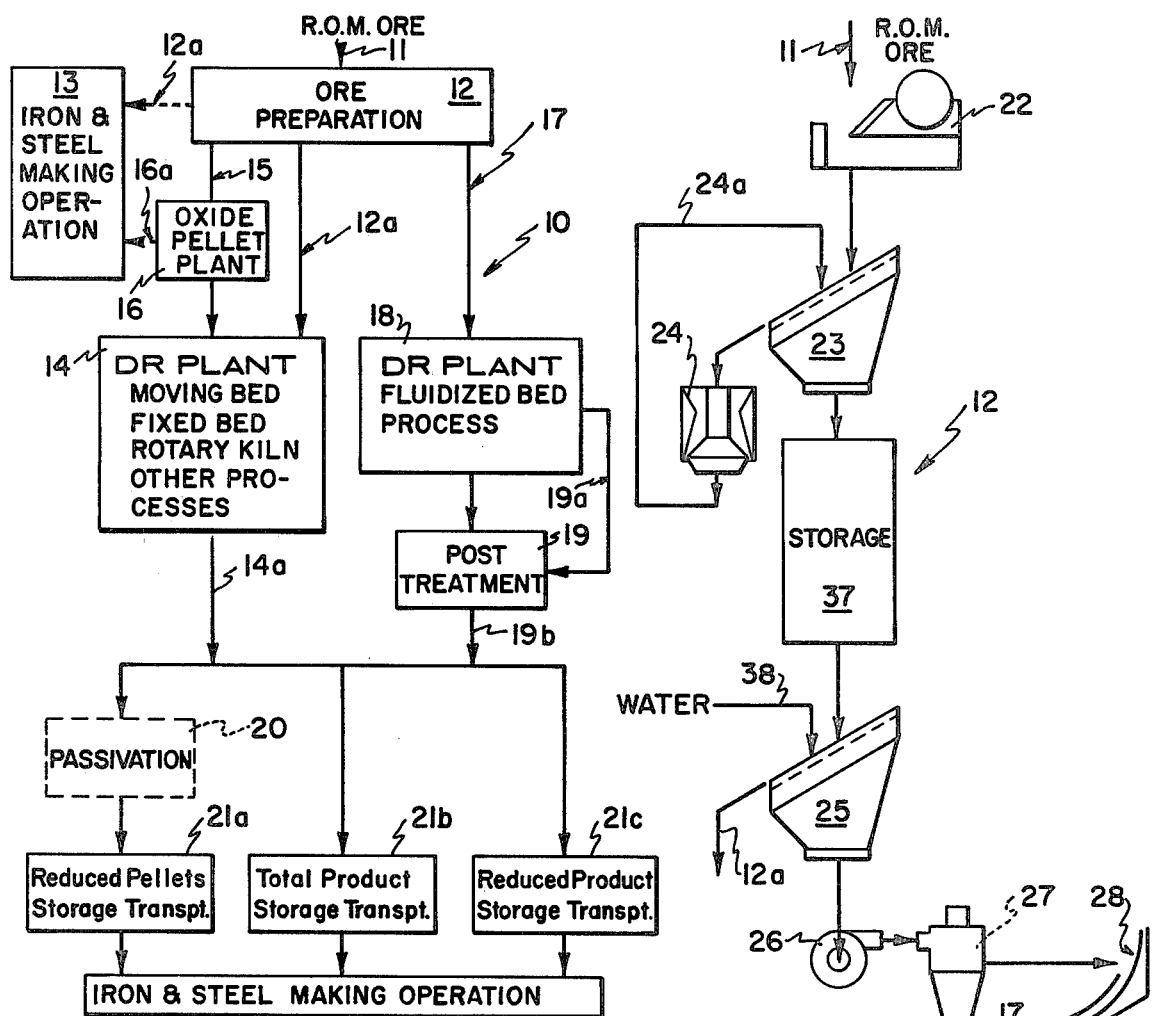

Referring now to the drawings:

Practicing the method of the present invention first involves separation of R-O-M (run-of-mine) iron ore into three fractions of controlled size range for processing by direct reduction or by conventional iron-making systems that are individually appropriate for employing a particular size range of ore. Such sizing is preferably practiced by efficient and inexpensive crushing followed by various conventional screening operations, as will be discussed later herein with respect to FIG. 2, with the resulting sized ore then metallized in a direct reduction system suitable for that particular size of ore, such system involving hybrid direct reduction facilities and, optionally, conventional ironmaking facilities.

Figure 2:
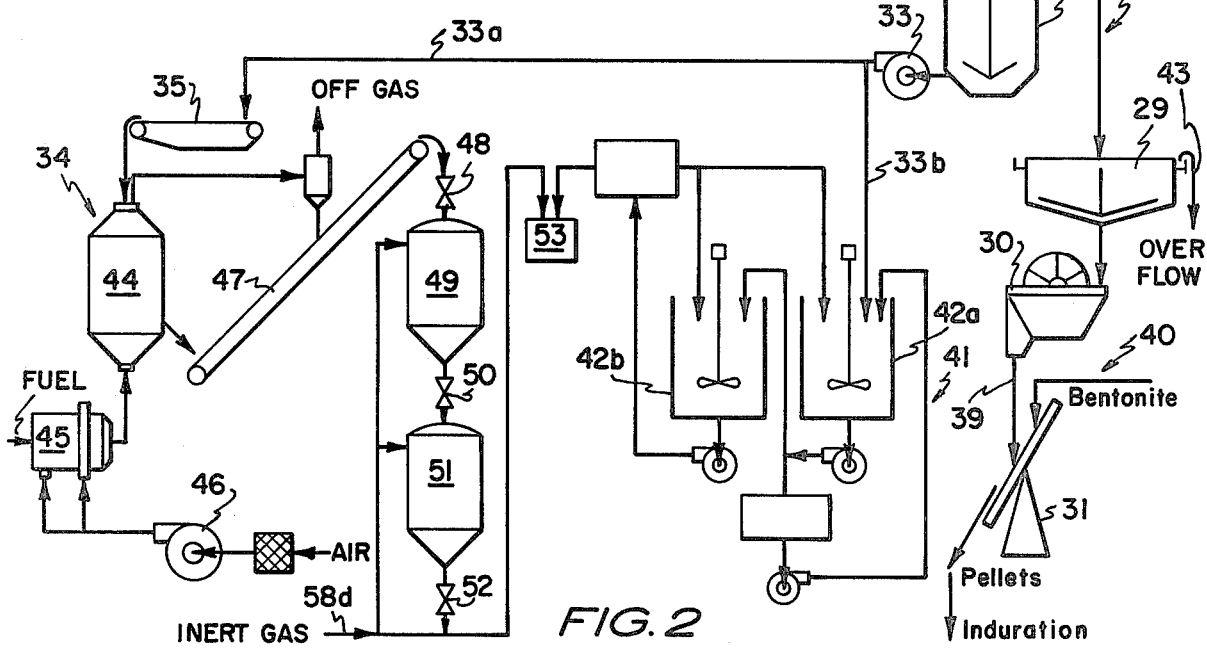

In FIG. 1 is shown a block schematic of an ore separation arrangement 10 showing R-O-M ore 11 passing through ore preparation facilities 12, which facilities 12 are shown in more detail in FIG. 2. In the ore preparation facilities 12 the R-O-M ore is separated into an over-size fraction 12a having a nominal size range of 1 inch × ¼ inch (25.4 mm × 6.3 mm); a mid-size fraction 17 having a nominal size range of ¼ inch × 200 mesh (6.3 mm × 200 mesh); and an under-size fraction 15 having a nominal size range of 200 mesh × zero. Shown by the broken line 12a extending from ore preparation facilities 12, the over-size or natural lump ore fraction 12a can be utilized in various iron and steelmaking operations 13, not shown, such as the iron-bearing burden material for conventional blast furnaces, or the like. For processing by direct reduction, as shown by the solid line 12a the over-size ore can be charged to a direct reduction plant 14 based on the reactor system that will most efficiently handle such material, namely a fixed-bed, moving-bed, rotary kiln, or a like process.

As also shown in FIG. 1, under-size ore 15, prior to its introduction into a direct reduction process or, optionally use in conventional ironmaking facilities, is preferably agglomerated in an oxide pellet plant 16 or like other conventional facility and procedure, such as sintering, wherein that fine ore is consolidated into pellets, or the like, for charging to direct reduction plant 14, or as shown by broken lines 16a to other iron and steelmaking operations 13.

Mid-size ore 17, shown in FIG. 1, is preferably moved from ore preparation facilities 12 to a direct reduction plant 18 that preferably employs fluidized bed reactors. Such mid-size ore is an optimal size for processing in a fluidized bed reactor, which processing will be described later in detail herein in relation to the apparatus and method for its use of the present invention.

Mid-size iron ore 17 that has been metallized to a desired degree in direct reduction plant 18, preferably undergoes post treatment 19 involving apparatus and processing whereby the metallized ore is cooled to near room temperature, preferably by passing inert gases 19a therethrough as shown in FIG. 1, which gases are preferably generated within direct reduction plant 18 as shown in FIG. 3 and as will be described herein. With respect to that FIG. 1 it should be understood that the product produced in the apparatus and with the method of the present invention while it is preferably cooled by passing inert gas thereover, as will be described in detail later herein, may receive post treatment in any conventional process whereby rapid re-oxidation is prohibited or is limited such that the product will remain at its high metallization level during storage and transport.

As shown at 21a and 21c in FIG. 1, the metallized products 14a and 19b, shown as arrows from direct reduction plants 14 and 18 may be separately stored and transported in which case, an optional passivation procedure 20, shown as a broken line box, may be required to prevent reoxidation of metallized product 14a during storage and transport. However, as shown at 21b, where the total product from both direct reduction plants are combined into a total product, such total product by a process not shown herein, may be immune from reoxidation effectively eliminating thereby the passivation procedure 20.

As stated hereinabove, FIG. 2 is a schematic representation of an ore preparation facility 12 for separating R-O-M iron ore into optimum size fractions for most effective and efficient processing in appropriate direct reduction and conventional ironmaking facilities. Individual equipment items as illustrated and described are conventional, but the particular equipment arrangement for achieving specific size ranges of R-O-M iron ore in an integrated ore preparation facility and for specific uses of said sized ores have not been employed for the preparation of feed ores for introduction into a hybrid direct reduction facility. Moreover, the enormous advantages in capital and operating expense and in trouble-free processing and operation of downstream direct reduction plants 14 and 18 have not been recognized when employing ore preparation facilities as described.

As illustrated in FIG. 2, R-O-M ore 11 first enters a primary jaw crusher 22 or like equipment for size reduction of extremely large lumps to a nominal top size of one inch (25.4 mm). In actual practice, depending upon the particular physical and chemical characteristics of the R-O-M ore and the characteristics of the downstream agglomerate-type direct reduction reactors or conventional ironmaking process, the optimum top size passed from crusher 22 may be somewhat larger, possibly 1¼ inches (31.8 mm) or even 1½ inches (38.1 mm). That ore is then passed over a vibrating screen 23, said screen size being one selected to divert "tramp" over-size ore to cone crushers 24, or the like, the product therefrom passing in closed circuit 24a back to vibrating screen 23. The resulting output from vibrating screen is therefore properly reduced in size with respect to the top size dimension and enters a storage facility 37, which storage facility provides surge capacity for following screening operation. From storage facility 37 the ore is passed over a vibrating screen 25, the screen mesh size thereof selected to pass a nominal ¼ inch (6.3 mm). However, again depending upon characteristics of the ore and the downstream direct reduction reactors or conventional ironmaking process, the size may be selected for as large as ⅜ inches (9.53 mm), and possibly as small as 10 mesh.

Vibrating screen 25 preferably employs a wet screening procedure with water shown at 38 preferably entering thereto from inert gas separator 58c, FIG. 3, carrying iron ore dust particles therewith for reprocessing. The water flow ensures effective stripping of undersize particles that tend to adhere to larger particles, a phenomenon often described in the art as "piggybacking". As indicated in FIG. 2 a natural oversize fraction 12a is obtained off from vibrating screen 25 having a nominal size range of 1 inch×¼ inch (25.4 mm×6.3 mm). This material, often referred to as direct shipping ore, and as indicated by solid and broken lines 12a in FIG. 1, is a good feed material for a direct reduction plant requiring agglomerates or as a blast furnace charge material.

Shown in FIG. 2, under-size ore from vibrating screen 25 is moved by a pump 26, or the like, and optionally through hydrocyclone 27 shown in broken lines, to a static wedge wire screen 28. In the static wedge wire screen 28, a nominal under-size ore fraction, that may be as small as 200 mesh×zero is separated and passed into a thickener 29. From thickener 29 this under-size fraction, after dewatering in a vacuum disc filter 30, or other suitable apparatus, is passed as a filter cake, arrow 39, to conventional pelletizing facilities or other suitable means for agglomeration, not shown. As part of the ore pelletizing process bentonite, arrow 40, is added and the moisture content thereof is adjusted, the mixture thereby being formed into "green" pellets in a disc 31, or in a drum pelletizer, not shown, or the like, whereafter the pellets are indurated at high temperatures in conventional kiln or grate facilities, not shown, to produce strong fired oxide pellets having a nominal ½ inch diameter. These pellets, solid line into 14 of FIG. 1, like the natural lump ore fraction, shown as solid line 12a, are suitable for use in a direct reduction plant requiring agglomerates or for use in a blast furnace process.

As shown in FIG. 2, the ore fraction indicated as having a nominal size range of ¼ inch×200 mesh is defined as mid-size ore that is appropriate for processing in the fluidized bed facilities of the present invention. However, as discussed later herein, this "nominal" size may vary considerably depending upon interrelated economic and technical factors. Shown in FIG. 2, such mid-size ore passes from hydrocyclone 27 or from static wedge wire screen 28 into an agitated holding tank 32, which tank 32 supplies the feed material for the direct reduction plant 18 of FIG. 1 discussed in detail later herein.

In FIG. 2 the mid-size ore from agitated holding tank 32 is shown preferably moved by pump 33 as a slurry 33a to a dry feed system 34 or as a slurry 33b to a wet feed system 41 for ultimately passing the ore into fluidized bed ore heaters shown in FIG. 2 as a block 53. Such feed systems are conventional and are herein described schematically. A preferred wet feed system 41 would consist generally of a weak slurry tank 42a followed by a strong slurry tank, 42b, with appropriate pumps for moving that slurry into fluidized bed ore heaters 53 shown as a block in FIG. 2 and in detail in FIG. 3, therein water is evaporated as a consequence of the high temperature ore heating operation to be described later herein.

The slurry 33a from pump 33 preferably travels to the dry feed system 34 on a belt extractor 35, or by other suitable means, removing some water therefrom, the filter cake then being dried by conventional fluidized bed or kiln thermal drying procedures, or other suitable means involving a fluidized bed dryer 44, which dryer provides heated air from an air heater 45, that air passed thereto from a blower 46. Dried ore is passed by a conveyer 47 through valve 48 into serial storage hoppers 49 and 51. A feed valve 50 is arranged for controlling ore movement between storage hoppers 49 and 51, dried ore passing therefrom through valve 52 into fluidized bed ore heaters 53 by pneumatic means.

In FIG. 2 the water stream 38 that also flows for wet screening to vibrating screen 25, originates from wet off gas scrubbers of the first, second and third reactors systems 69, FIG. 3, and 81a and 84a FIG. 5, is also employed to clean and cool hot off gas from the direct reduction plant 18 of FIG. 1 and the scrubber of the direct reduction plant 14, also of FIG. 1. So arranged, dust particles consisting of fine iron ore are thereby recycled to the ore preparation facilities, thus establishing a closed circuit system and essentially eliminating economic losses of iron units and, moreover, environmental problems of both air and water pollution. To complete this closed circuit, shown in FIG. 2, the thickener 29 overflow 43 serves as a source of water for wet off gas scrubbers 69, 81a, and 84a, required in the direct reduction plant 18.

The ore preparation facilities and procedures have been included herewith as examples only useful for producing three "custom-made" size fractions for optimum processing in a hybrid process containing direct reduction and ironmaking facilities most suitable for handling that particular size fraction of ore. It should, of course, be understood that the three "nominal" size fractions may vary in size for specific technical and economic reasons.

As stated hereinabove, it has long been recognized by those skilled in the design and operation of blast furnaces and shaft furnace reactors, such as those employed for direct reduction, that the charge materials must be properly sized to allow uniform permeability of the burden and to avoid channelling of gas and poor contact between gas and solids. Thus, an agglomerated burden is necessary for most efficient operation with a minimum of uncontrolled small sizes, and a nominal preferred size for natural agglomerates is often specified such as 1 inch×¼ inch (25.4 mm×6.3 mm). However, depending upon the chemical and physical characteristics of particular ores in relation to design and operating characteristics of various reactors, the wider limits for preparing natural ores may be 1½ inch×10 mesh (38.1 mm×10 mesh).

For man-made agglomerates as produced from fine ores, such as by the described pelletizing process, the final indurated oxide pellets are usually a nominal ½ inch (12.7 mm) in diameter with a range between ⅜ inch and ⅝ inch (9.53 mm×15.88 mm). For effective balling to produce "green" pellets for induration, as shown in FIG. 2, it is necessary that all ore be at least minus 65 mesh and often to minus 200 mesh, depending upon the range of particle sizes comprising the total mixture and other physical properties of particular ores. Thus, if a facility consists only of systems for processing agglomerates, either direct reduction or blast furnaces, size reduction of mid-size ore must be accomplished in, for example, expensive ball mills for grinding. Recognizing that R-O-M ores often consist of 50 percent or more such mid-sizes, the required ore preparation facilities become extremely complex and expensive as compared to the facility of FIG. 2 that has no grinding equipment.

In considering fluidized bed reactor systems for metallurgical processing, such as by direct reduction, the extreme importance of exercising control of both upper and lower size limits on the feed ore has not heretofore been fully recognized. Establishing an upper limit of particle size is, of course, obvious as particles must be small enough for the upflowing gases to impart movement, with such upper range often specified as minus ⅜ inch (9.53 mm) or ¼ inch (6.35 mm), and sometimes constrained to 10 mesh. However, prior to the present invention, it has not been recognized that a lower limit of particle size is equally important. This lack of recognition provides apparent advantages in a simpler ore preparation plant in which generally only crushing and screening are required and with no facilities for pelletizing or otherwise agglomerating the under-size ore fraction. However, major penalties occur in the downstream fluidized bed reactors as now explained.

Such penalties incurred by employing fine ore fractions, generally smaller than 200 mesh, are first that, elaborate and expensive internal and external dust collectors must be provided with the reactors to retain most of this material. Thus, appreciable operating problems and equipment downtime are created by this equipment and losses of fine material still occur that must be collected and handled in other ways. Secondly, fine ore fractions within such reactors often rapidly plug or sometimes erode the gas distributor plates and orifice holes in such reactors, thus resulting in short operations thereof. Eliminating fine fractions effectively avoids such problems, and also provides certain advantages. Such a major and unexpected advantage is that the absence of fine fractions markedly decreases the tendency of iron ores undergoing high-temperature reduction to sinter and defluidize that would cause productive operations to cease. Thus, with proper ore size selection, "safe" operating temperatures can be increased by 100° F. to 200° F. (56° C. to 111° C.). Additionally, a higher degree of metallization, up to 95%, can be obtained without occasioning certain problems such as sintering and defluidization, and many ores presently considered unsuitable for fluidized bed processing could be so handled. These factors, and especially the increases allowed in operating temperatures, result in increased reaction rates and more efficient conversion of reducing gases resulting, of course, in more effective utilization thereof and decreases in gas flows per unit of solids being treated, as well as, decreases in solids retention times in contact with reducing gases, and providing thereby for corresponding increases in productivity of metallized iron ore. Further, substantially fewer losses of solids occur from the reactors of the present invention and the overall size of the reactors can be decreased, saving thereby on equipment costs.

Shown in FIG. 3, select "custom-made" mid-size ore is fed, as previously described by alternative wet or dry means, at controlled rates through a valve 54 into a first stage 55 of ore heater 53. Ore heater 53 preferably has pressurized first and second stages 55 and 56 containing fluidized beds of mid-size ore, that ore flowing at controlled rates from the first stage 55 through valve 57 into the second stage 56.

The purpose of passage of the ore through the ore heater 53 is to raise the ore temperature sufficiently to supply thereto part of the endothermic heat of reduction required to reduce and metallize that ore in downstream fluidized bed reactors. The mid-size ore heating is preferably accomplished in the first stage 55 by sensible heat exchange with hot off-gases passing up from the second stage 56, gases in both stages passing countercurrent to the ore flow therethrough. In the second stage 56 air and fuel are burned at the stochiometric ratio, with the resulting hot products of combustion passing through the ore bed raising the temperature of that ore to a range between 1400° F. to 1800° F. (761° C. to 983° C.).

Although the temperature to which the ore is raised in the second stage 56 is controlled by the fuel and air input thereto, the temperature to which the ore is elevated in the first stage 55 is dependent upon the overall heat balance, but may reach as high as 800° F. (427° C.). It is, however, important that independent control of this temperature be exercised to maintain it at lower levels, generally under 650° F. (344° C.), because, as recognized by the present inventor, many iron ores will display severe attrition and generate appreciable quantities of extremely fine particles, less than 200 mesh, from larger particles when they are rapidly heated, such as in a fluidized bed operating above about 650° F. (344° C.). This phenomenon occurs even with particles that have been dried externally of surface moisture. This occurs because iron ore particles are generally porous and retain appreciable "bound" water in the pores and capillaries, and, moreover, contain appreciable amounts of L.O.I. (Loss on Ignition) constituents such as water of hydration. Thus, the present inventor determined that such volatile components may cause larger particles to explode into finer particles when heated rapidly to temperatures above about 650° F. (344° C.). This occurance would to an extent defeat one purpose of the ore preparation plant, which, as previously described, was to prepare mid-size ore for use in fluidized bed reactors free of all particles smaller than 200 mesh. This unfavorable phenomenon may be largely avoided by inclusion of a water spray nozzle 55a in the first stage ore heater 55 to modulate the bed temperature therein, which water spray utilization for controlled cooling is an example of an arrangement for providing close temperature control to the first stage ore heater 55 and is included herewith as an additional step in practicing the method of the present invention.

Shown in FIG. 3, the off-gas flowing through line 58a from ore heater 53, consisting mainly of nitrogen ($N_2$) carbon dioxide ($CO_2$) and water vapor, is passed for scrubbing and cooling through venturi 58b that introduces water for mixing therein, scrubbing and cooling that off-gas, that then flows into a separator 58c. Additional water is introduced into separator 58c thereof. After scrubbing, said water, now containing iron ore dust particles, flows out from the bottom through line 38, to the wet screening operations of the ore preparation facilities as described earlier herein. Thereafter, the scrubbed off-gas, now consisting mainly of nitrogen ($N_2$) and carbon dioxide ($CO_2$), flows from separator 58c, through line 58d as inert gases for use in the plants for miscellaneous purges, for pneumatic transport gas in the ore feeding system, and for product cooling and post treatment as will be described later in this application with respect to FIG. 8.

In the two stage ore heater 53, the first stage 55 captures and uses effectively sensible heat from the second stage 56, as described hereinabove, which arrangement is preferred for practicing the method of the present invention. It should, however, be obvious that other heat recovery equipment in a single stage ore heater could be employed to capture that heat, such as a waste heat boiler, or the like, although problems of attrition and generation of fine particles would be troublesome when using some of the types of iron ores as previously described. From the two stage ore heater 53, as will be described in detail later herein, the heated ore travels through line 53a into a first ore reducer stage 66 of a first ore reactor system 65.

In a gaseous direct reduction process, particularly with a fluidized bed reactor, it is advantageous to be able to employ some appreciable amounts of solid carbonaceous fuels such as coal and the ore heater facilities as described presents such an opportunity. This is accomplished by substituting coal for gaseous fuels such as natural gas in the second stage 56 and this stage operates as a fluidized bed coal combustion unit. Within the knowledge of the inventor this procedure has not been heretofore recognized as a practical means of employing coal in a direct reduction facility and so is included herewith as an optional step in practicing the method of the present invention.

Shown in FIG. 3 is a preferred arrangement of a natural gas reformer unit 59 wherein the component gases that make up natural gas, as shown in the chart of FIG. 3a, are reformed by a steam process into hot reducing gases. Shown in schematic, that reformation preferably involves passing the feed stock natural gas through a container 60 wherein sulfer is removed and thence to an upper chamber 61 wherein steam is added, changing thereby that natural gas, within catalyst tubes 62, to the gases shown in the right hand column of FIG. 3a. These gases at a temperature of between 1500° to 1700° (815° to 925° C.) travel to a first ore reactor system 65 entering the second ore reducer stage 67 thereof through line 63a.

Shown in FIG. 3a are typical compositions of a feedstock natural gas and the resulting hot reformed gas produced, as, for example, in the natural gas reformer 59, as described hereinabove, by high temperature catalytic steam reforming at near unity steam-to-carbon ratio. While such steam reforming process directly produces a hot gas stream with high amounts of hydrogen ($H_2$) and carbon monoxide (CO) suitable for reducing iron ore without further operations, the present invention is not limited to this process and can be practiced with reducing gases from other gas processes and sources. These may include, for example: steam reforming of natural gas at high steam-to-carbon ratios followed by quenching to remove excess water and then reheating; reducing gases produced by partial oxygenation of fuel oil; from various coal gasification processes, or the like. However, use of other such reducing gas sources would obviously require certain changes in practicing the present invention, which changes would, however, still fall within the scope of the present disclosure.

Practicing the method of the present invention involves producing or otherwise providing hot reducing gas or gases, a major component of which needs to be hydrogen ($H_2$), and these must be provided in a heated condition of between 1400° F. and 1800° F. (761° C. and 983° C.) to supply part of the endothermic heat of reducing iron ore. These hot gases as stated above, travel, through line 63a to the first ore reactor system 65, enter the second ore reducer stage 67 thereof to reduce and metallize hematite ($Fe_2O_3$) or magnetite ($Fe_3O_4$), depending upon the particular ore used therein, first to wustite (FeO) and thence to iron (Fe), such reactions occurring at temperatures of 1200° F. to 1500° F. (649° C. to 816° C.). The first ore reactor system 65, of course, consists of one or more fluidized beds of ore, preferably two, shown herein as first and second ore reducer stages 66 and 67, described in detail hereinbelow, which beds are arranged such that the flow of ore and gases are continuous and counter-current. The reduction with hydrogen ($H_2$) being:

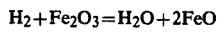
$$H_2 + Fe_2O_3 = H_2O + 2FeO$$

$$H_2 + Fe_3O_4 = H_2O + 3FeO$$

and

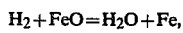
$$H_2 + FeO = H_2O + Fe,$$

and with carbon monoxide (CO) being:

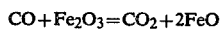
$$CO + Fe_2O_3 = CO_2 + 2FeO$$

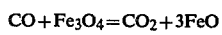
$$CO + Fe_3O_4 = CO_2 + 3FeO$$

and

$$CO + FeO = CO_2 + Fe$$

The reducing gases hydrogen ($H_2$) and carbon monoxide (CO) that make up, as shown in FIG. 3a, approximately 68.60% and 20.70%, respectively, of the reducing gas, are decreased each by approximately 25% by the formation of water vapor ($H_2O$) and carbon dioxide ($CO_2$) as oxidizing components as a consequence of reducing and metallizing the iron oxides. As will be explained later herein it is the potential productive utilization of the off-gas from the first ore reactor system 65 for additional ore reduction that is a major step in practicing the present invention.

Shown in FIG. 3, the first ore reactor system 65 preferably employs first and second ore reducer stages 66 & 67 wherein are contained fluidized beds of heated ore that each flow downwardly as the reducing gas moves counter-currently upwards thereto. The moving ore is changed thereby to wustite (FeO) in the first ore reducer stage 66 and to iron (Fe) in the second ore reducer stage 67. The amount of metallization of that ore into iron is dependent upon the amount of reducing gases flowing therethrough, the temperature of the fluidized beds, the retention time of the ore within the reactors, and the reducing gas composition and pressure. The intention of the apparatus and practice of the method therewith of the present invention being to achieve up to 90% to 95% metallization therein. A valve 63 allows for controlled passage of ore from the first ore reducer stage 66 to the second reducer stage 67.

In FIG. 3, associated with the ore entering the first ore reducer stage 66, is shown a presentation breakdown of that ore showing it to be 95.0% hematite ($Fe_2O_3$) and 5.0% gangue. Which composition, it should be understood, is hypothetical as is the gas composition, as presented in FIG. 3a and the gas volume shown in FIG. 3 entering first ore reduction system 65 through line 63a. Such flows do, however, reflect proper and practical ratios of gases to solids under the conditions in which the present invention could be practiced, to, for example, achieve a desired 90% to 95% metallization. Based upon 95% $Fe_2O_3$ content of the dry ore, the indicated reducing gas flow, and with sufficient retention time of solids in the reactor, the product of the first ore reactor system 65 shown as flowing therefrom at 65a, for post treatment 19, as described with respect to FIG. 1, will be approximately 81.53% Fe, 11.65% FeO, and 6.82% gangue, which gangue includes all nonvolatile components in the midsize R.O.M. ore such as silica ($SiO_2$), alumina ($Al_2O_3$), and the like. Volatile components such as free moisture, "bound" water, water of hydration, and the like, having been, of course, removed in the ore heater 53. The metallized product composition contains therefore approximately 90.59% total iron (Fe) and is equivalent to approximately a 90% metallization. Such product is then post treated, as shown at 19 in FIG. 1, by inert off-gas from the ore heater 53.

While the first ore reactor system 65, as shown in FIG. 3, preferably involves first and second ore reducer stages 66 and 67, each operating under appropriate high pressure, obviously a third ore reducer could be added thereto for additional retention time and higher metallizations, which addition would still come within the present disclosure.

The off-gas passing from the first ore reducer stage 66 consists of approximately 52.38% hydrogen ($H_2$), 24.16% water vapor ($H_2O$), 14.69% carbon monoxide (CO), 7.81% carbon dioxide ($CO_2$), and 0.96% inert gases, the residual high amounts of hydrogen ($H_2$) and carbon monoxide (CO) resulting from inherent thermodynamic and kinetic limitations as previously discussed. The off-gas from the first ore reactor system 65 travels therefrom through line 65b for conventional scrubbing into a venturi 69a and separator 69, shown in FIG. 3, wherein water vapor and any entrained solids are removed after which the scrubber stream 38, like the stream from the separator 58c returns to the wet screening portion of the ore preparation facilities.

After treatment in venturi 69a and separator 69 and possibly additional drying, the off-gas therefrom consists of approximately 69.07% hydrogen ($H_2$), 19.37% carbon monoxide (CO), 10.30% carbon dioxide ($CO_2$), and 1.26% inert gases. This off-gas, while it can be used in a variety of plant operations such as burning for steam generation, heating reformer catalyst tubes, and the like, considering the appreciable capital and operating costs and energy expended to reform natural gas to reducing gases that are not greatly dissimilar in composition to off-gas from scrubber 69, such utilization is very wasteful and inefficient. Moreover, when it is considered that only approximately 25 to 30 percent of the effective components of reformed gas, hydrogen ($H_2$) and carbon monoxide (CO), are consumed for ore reduction in a single pass through a reactor system, burning for such purposes is extremely inefficient. Therefore, the present invention provides apparatus and a method for its use for utilizing that off-gas as a reducing gas, requiring only minimum processing, providing thereby for more efficient gas utilization resulting in increased efficiency and production of metallized iron ore. Further, hydrogen ($H_2$) that is the most abundant component in the off-gas, is also the better reducing gas as compared to carbon monoxide (CO), both kinetically and thermodynamically, and, moreover, carbon monoxide (CO) in the mixture can be inexpensively converted to additional hydrogen ($H_2$) by conventional technology. Therefore, the present invention teaches that the most effective, efficient and least expensive beneficial use of that off-gas is to add serial facilities for additional product capacity utilizing that off-gas as the reducing gas therein, after a shift conversion and removal of carbon dioxide ($CO_2$) thereof as described herein below with respect to FIG. 4.

Shown in FIG. 4 is a facility for processing that off-gas from scrubber 69 shown at A in FIG. 3, and adjusting its composition to achieve its full reduction potential for treating additional iron ore in serially arranged ore reactor systems like that described with respect to first ore reactor system 65. That off-gas in FIG. 4 is shown to first undergo a water-gas shift reaction in a conversion unit 70 wherein excess steam, introduced at 70a, converts substantially all of the contained carbon monoxide (CO) to carbon dioxide ($CO_2$) and additional hydrogen ($H_2$) according to the reaction:

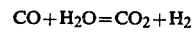

Thereby, the percentage and amount of hydrogen ($H_2$) is enhanced, and the less efficient and desirable carbon monoxide (CO) that originally comprised about 19.37% of the mixture is effectively eliminated. This conversion involving water-gas shift reaction that is catalytically preferably promoted by iron and alkaline earth oxides in vessels shown at 71, at relatively low temperatures of 660° to 930° F. (350° to 500° C.). The shift conversion as described above is commonly known to conventional gas purification technology, together with the next purification operation, that have been in use for decades in ammonia and natural gas processing plants. Such technology has not, however, heretofore been used to process off-gas from direct reduction reactor systems to achieve additional reducing gas utilization and incremental scaleup capacity in the manner described by the present invention.

The gases consisting, as shown in FIG. 4, of approximately 74.09% $H_2$, 24.85% $CO_2$, and 1.06% inerts, from the shift converter unit 70 are then cooled in heat exchanger 72, with water being removed therefrom in a condenser 73. These gases then pass into an absorber 74, first entering a tank 74a and involves a stripper 74b wherein carbon dioxide ($CO_2$) is absorbed. Absorber 74 is also a conventional facility that employs caustic, amine, carbonate solutions, or the like, the gas passing therethrough to remove carbon dioxide ($CO_2$) from the gas, leaving the final gas, as shown, consisting of approximately 98.59% hydrogen ($H_2$) and 1.41% inert gases. By this procedure the final gas available volume has decreased by a moderate 10% from 66,950 SCF (1,896 m$^3$) to 60,027 SCF (1,700 m$^3$), but its quality for additional ore metallization has been greatly enhanced as it now consists of nearly pure hydrogen ($H_2$).

The gas, as shown in FIG. 4, is then heated in, as for example in a fired gas heater 75 to raise its temperature between 1400° and 1800° F. (761° and 980° C.) for introduction into a second reactor system 80, which reactor system is shown in schematic in FIG. 5. The second reactor system 80, it should be understood, is like the first reactor system, shown in FIG. 3, with like auxiliary facilities, such as ore heaters, the total reducing gas required for its operation consisting of the off-gas from that first reactor system 65. As shown by the example quantities of reducing gas available for the first and second reactor systems, the gas available for the second reactor system has been decreased by approximately 32 percent from 88,280 SCF (2500 m$^3$) to 60,027 SCF (1700 m$^3$), but, because the inlet gas at B to the second reactor system 80 is a better reducing gas, it being nearly pure hydrogen ($H_2$), its reducing ability is greatly enhanced, and so the productivities of the two reactor systems will be nearly the same. As shown by the table of FIG. 5a, with relative system productivity shown as 1.00 for the first reactor system 65, productivity for a second reactor system will be approximately 0.94 for producing product of like metallization, namely, 90%. Similarly the table of FIG. 5a shows that, with minimum energy and less costly equipment for cleaning and re-processing the off-gas from the first reactor system 65, the overall gas utilization is also essentially doubled. Therefore, such off-gas utilization as taught by the present invention is a far more efficient use for that off-gas than former procedures discussed earlier herein. It is also evident that the capital and operating costs, along with energy requirements, for the second reactor system 80 to include gas purification procedures and heating, will be considerably less than those required for the first reactor system 65. Such savings are largely attributable to the fact that conventional low-temperature gas treating facilities, like those described, are far less expensive to construct and operate than are high-temperature reformer facilities or other gas production means.

While fluidized bed reactor systems lend themselves to high pressure operation, related and adjacent units may still operate efficiently at different or lesser pressures, and therefore the second reactor system 80 will operate efficiently at a lower pressure than the first reactor system 15, eliminating thereby the need for expensive inter-system compression facilities, which advantage also may apply to compression facilities for such inter-system gas treating facilities for purification of off-gases.

As shown in the table of FIG. 5a, production and reducing gas utilization can be essentially doubled by employing a second reactor system. Moreover, optionally, to further increase productivity and gas utilization, a third, fourth, or more reactor systems can be employed. For example, where a third reactor system 83, that should be understood to be like the first and second reactor systems 65 and 80, is serially installed to receive the off-gas from the second reactor system 80, after that gas is scrubbed in venturi 81 and heated in fired gas heater 82, as shown in FIG. 5. Again, as with the second reactor system 80, interstage gas compression is not necessarily required inasmuch as reactor system 83 may operate at a lower pressure than reactor system 80. Shown in FIG. 5 and the table of FIG. 5a, the use of a third reactor system 83 results in a total reducing gas utilization of approximately 63.74% and an additional metallized ore production of 0.65, as compared to 1.00 that of the first reactor system 65, the total systems productivity being enhanced by a factor of 2.59 relative to 1.00 for a single reactor system.

Obviously, additional reactor systems could be added to further utilize the remaining reducing gas, obtaining thereby corresponding productivity increases. However, after passage through the third reactor system 83, such increases in productivity become progressively smaller so as not to warrant the equipment required. Further, the percentage of inert gases would increase, and an infinite number of serial reactor systems would be required to achieve 100% gas utilization. Moreover, it would not be possible to do without expensive interstage compressors for the gas after such third reactor system. Instead, as covered hereinbelow, from the third reactor system 83, after scrubbing at 84 in venturi 84a, in FIG. 5, which scrubber facility is like the facilities described with respect to the first and second reactor system, the off-gas could better be used as an additive to the reducing gas flowing into the first reactor system 65 as shown in the block schematic of FIG. 6.

The ability to employ elevated reactor pressures for fluidized bed systems provides an arrangement for obtaining even greater increases in gas utilization and productive capacity. Specifically, the off-gas from the third reactor system 83, while it can be burned for plant heating purposes, or the like, after scrubbing, needs only to be compressed and reheated to the temperature of the reducing gas entering the first reactor system 65 for introduction therewith into that first reactor system. Shown in the block flow of FIG. 6, the off-gas from that third reactor system 83, after a purge stream is removed to control the accumulation of inert gases, is preferably recompressed at 85 and heated at 86, increasing the example inlet reducing gas total from 88,280 SCF (2,500 m$^3$) to 138,172 SCF (3,771 m$^3$). Simultaneously, of course, because of this volume increase, all reactor system pressures are increased to maintain the flow velocities of gases through the various reactor systems to the previously desired rates. Shown in the table of FIG. 6a, when the off-gas from third reactor 83 is so recycled, the total gas utilization for the three reactor systems increases to 94.76% and the total systems productivity increases to 3.87 relative to 1.00 for a single reactor system. Also, it should be noted that the size of the recycle facilities is thereby minimized, and, in the example persented, a recycle ratio of approximately 0.55 is employed, or 55 units of recycle gas for each 100 units of fresh reducing gas. In other processes in which recycle has been employed, the recycle ratio is much higher, in the order of 2.0 and the recycle facilities are necessarily larger and more costly than those of the present invention. While such recycling is preferred to provide increased productivity, should such additional capacity not presently be needed the off-gas can be usefully burned, or the like, until such large incremental scaleup capacity is required from the single-line plant. Moreover, it is obvious that the described second and third reactor systems need not be included with the described first reactor system 65, but can be added as increased production is desired providing thereby for an incremental scale up capacity to a single line production plant that is unique to the present invention.

Figure 7:
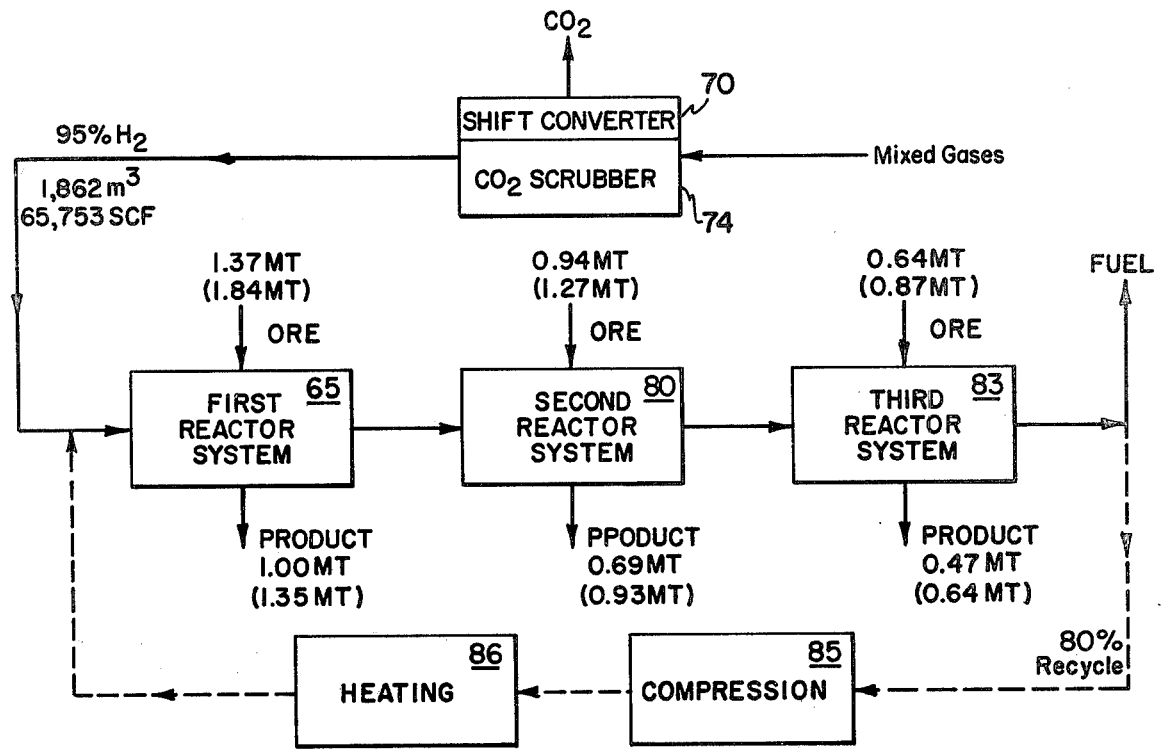

As stated previously herein, the process of the present invention can be performed using any reducing gas having a high percentage of hydrogen ($H_2$). In the previous examples a special case of reforming at near unity steam-to-carbon ratio was used wherein the gas leaving the reformer unit is of sufficiently high temperature and of suitable composition to be directly introduced into the first reactor system 65. As a result the shift conversion and $CO_2$ stripping facilities were preferably positioned between the first and second reactor systems 65 and 80. Should other sources of reducing gases, such as those obtained by remotely located coal gasification plants be used, or remotely located natural gas reforming operations be employed, whose output when received would be at room temperature then, of course, the plant components described have to be altered appropriately. An example of such an alteration is shown in a block flow diagram of FIG. 7 wherein the first reactor system 65 is shown to receive reducing gas from the shift converter 70 and $CO_2$ absorber 74 described herein with respect to FIG. 4 that provides almost pure hydrogen ($H_2$) thereto. Also indicated in FIG. 7 are relative gas flow rates and relative productivities based upon one unit of metallized iron ore at 90% metallization being obtained from the first reactor system 65. The figures in parentheses therein indicating the relative increases in productivity when off-gas from the third reactor system 83 is recycled in the amount of 80%.

The process of the present invention, it should be understood, is not dependent upon the flow rates, ore input rates, or percentages shown and described herein, which figures have been included for demonstration only said data representing only a model with approximate ratio relationships between the components providing for a more complete illustration and understanding of the apparatus and method of the present invention. The present invention, it should be understood, should not be taken as being dependent upon the figures shown or on any particular operating variables. From the present disclosure many variations and alternative operations should be readily apparent to one skilled in the art which variations and alternative operations would still fall within the scope of the present disclosure.

Figure 8:
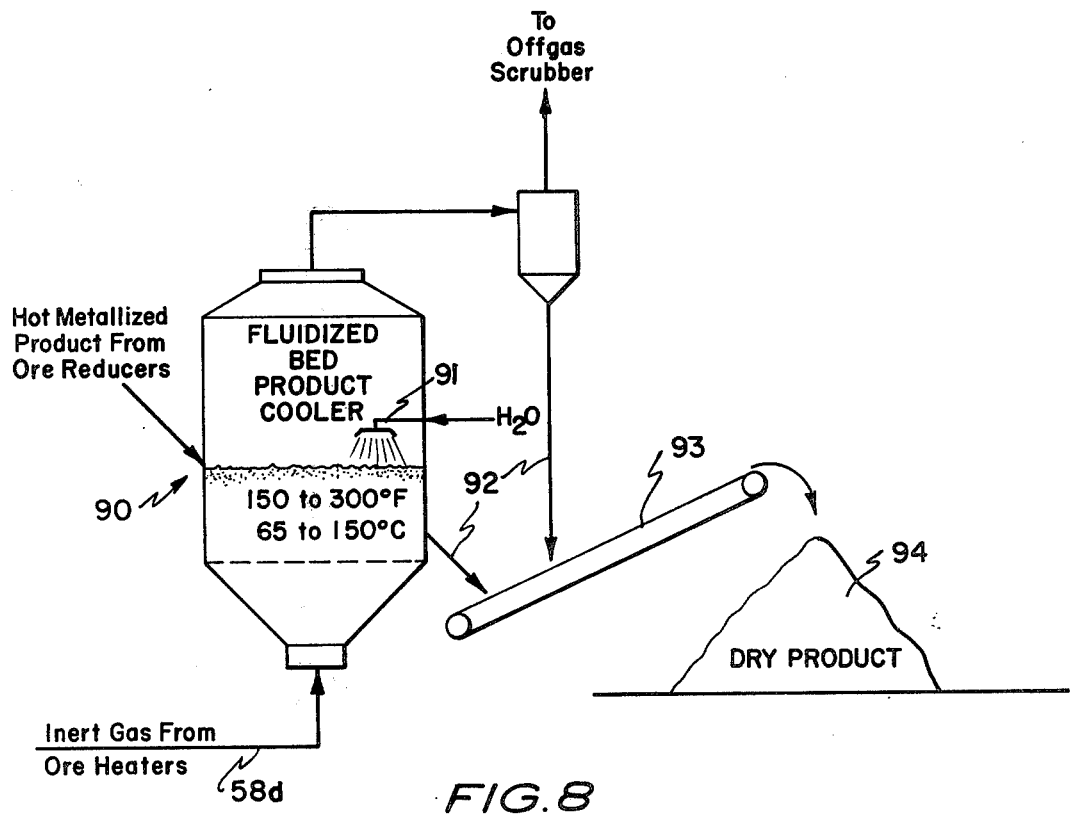

Although as mentioned earlier herein, the product produced in the apparatus and by the method of the present invention can be handled by known conventional techniques, with most such techniques involving briquetting of the hot metallized powder followed by cooling of the briquettes, the present invention employ preferably, inert gases generated during combustion in the ore heaters to directly cool the metallized powder to room temperature. FIG. 8 illustrates an example of such ore post treating as involved cooling of the hot metallized powder from the fluidized bed reactor systems to 150° F. to 300° F. (65° C. to 150° C.) in a fluidized bed apparatus 90 with cold inert gases entering thereto, after scrubbing, through line 58d, from the ore heater 53. Cooling of the ore is preferably augmented by water spray 91, as indicated. The product 92, moves by conveyor 93 to dry product storage 94. Carbon dioxide ($CO_2$) and water ($H_2O$), when momentarily in contact with hot metallized powder, cause a slight surface reoxidation thereof and passivation during this post treatment operation. The resulting powder, when so treated, can be stored, as at 94, in the open for years with negligible loss of metallization in stark contrast to the assumption that metallic powders with large exposed surface areas will be pyrophoric and rapidly oxidize. The above post treatment should be understood to be an outline of a preferred post treatment process of the present inventor that will be discussed in more detail in a subsequent application for United States Patent to be filed and is included herewith to outline a use for the inert gases produced in ore heater 53, showing the present invention and such post treatment to be parts of a total scheme for metallizing by direct reduction techniques and handling of that metallized product.

Although a preferred embodiment of the apparatus of the present invention and a method for its use have been herein disclosed, it should be obvious that the present disclosure is made by way of example and that variations are possible without departing from the subject matter coming within the scope of the following claims, which claims I regard as my invention.

I claim:

1. Direct reduction apparatus operating under pressure producing metallized iron ore from selected feed stock comprising, iron ore heater means for providing controlled heating of a select size of iron ore therein to dry that ore and to raise the temperature thereof sufficiently to supply thereto part of the endothermic heat of reduction required to metallize said ore in a downstream reactor;

means for pressuring to the pressure of a first pressurized fluidized bed ore reactor system said dried and heated iron ore and moving said dried and heated iron ore;

a first pressurized fluidized bed ore reactor system arranged to receive said dried and heated ore and consisting of a housing wherein is arranged an ore bed that moves counter-currently to a flow of reducing gas therethrough, that opposite flow being at a rate such as to produce up to a ninety-five percent (95%) metallization of that ore;

(a flow of) reducing gas (at the) pressurized to the pressure of said first reactor system (pressure) and passed into said first reactor system having hydrogen ($H_2$) and carbon monoxide (CO) gases as major constituents thereof, which reducing gas prior to its entry to said first reactor system is heated appropriately to supply part of the endothermic heat of reduction required to metallize iron ore;

scrubber means for scrubbing off-gas from said first reactor system, removing water and solids therefrom;

shift conversion and stripping means for converting carbon monoxide (CO) in said off-gas to carbon dioxide ($CO_2$) and for removing carbon dioxide ($CO_2$) therefrom leaving hydrogen gas ($H_2$) and inerts only;

means for heating said hydrogen gas ($H_2$) and inerts to supply thereto part of the endothermic heat of reduction required to metallize iron ore;

a second pressurized fluidized bed ore reactor system like the described first reactor system metallizing, to the same percentage a bed of iron ore therein that is constructed like the bed of the first reactor system, and is arranged to receive and pass counter-currently to the moving ore therein, inlet pressure of said second reactor system being that of said converted, stripped and heated off-gas producing thereby metallized iron ore as a product therefrom;

scrubber means arranged to receive off-gas from said second reactor system for scrubbing that off-gas to remove water and solids therefrom; and means for beneficially using said scrubbed off-gas from said second reactor system.

2. Direct reduction apparatus as recited in claim 1, wherein the ore heater means consists of, a housing containing two stages of fluidized mid-sized iron ore beds;

valve means for controlling flow of iron ore between said stages;

a fuel air mixture burned to pass hot gases through said stages, counter-current to said iron ore movement therein, that burning being at the stochiometric ratio to supply endothermic heat of reduction to said iron ore in said second stage, heating with sensible heat the iron ore in said first stage;

means for controlling the temperature of the iron ore in said first stage;

scrubber means for removing water and solids from the off-gas from said heater, which off-gas contains inert gases; and means for transporting and beneficially using said inert gases.

3. Direct reduction apparatus as recited in claim 2, wherein the means for controlling the temperature of the iron ore in said heater first stage consists of, a spray nozzle arranged to pass water therethrough onto iron ore in said heater first stage.

4. Direct reduction apparatus as recited in claim 1, wherein the first and second pressurized fluidized bed ore reactors each consists of,
   a housing containing two stages therein; and
   valve means for controlling ore flow between the stages, each stage maintaining a bed of iron ore therein and is arranged to pass the flow of reducing gas counter-currently therethrough.

5. Direct reduction apparatus as recited in claim 1, wherein the means for providing reducing gas to the first reactor system consists of,
   means for steam reforming of natural gas to produce a heated reducing gas having hydrogen ($H_2$) and carbon monoxide (CO) as major constituents thereof.

6. Direct reduction apparatus as recited in claim 1, further including,
   a third pressurized fluidized bed ore reactor system like the first and second reactor systems containing a fluidized bed of iron ore that is like the iron ore beds in the first and second reactor systems, and is arranged to receive and pass counter-current to the iron ore bed movement the off-gas from the second reactor system;
   means for heating said off-gas from said second reactor system to supply part of the endothermic heat of reduction required to metallize iron ore thereto prior to its entry into said third reactor system; and
   scrubber means arranged to receive off-gas from said third reactor system for scrubbing that off-gas to remove water and solids therefrom.

7. Direct reduction apparatus as recited in claim 6, further including,
   a means for transporting and beneficially using off-gas from the third reactor system consisting of,
   means for removing inert gases therefrom;
   means for compressing and heating said off-gas to the pressure and temperature of the reducing gases entering the first reactor system; and
   transport means for passing said off-gas into the reducing gas flow entering said first reactor system.

8. Direct reduction apparatus as recited in claim 7, further including,
   means for transporting solids removed during scrubbing of the off-gases from said first, second and third reactor systems to a source of iron ore feed stocks.

9. A method for metallizing select size of iron ore comprising the steps of,
   passing a select size of iron ore suitable for direct reduction in a first pressurized fluidized bed ore reactor system to such system, which ore has been heated so as to provide a part of the endothermic heat of reduction required to metallize that ore in said first reactor system;
   passing a flow of reducing gas heated so as to provide a part of the endothermic heat of reduction required to metallize iron ore, having hydrogen gas ($H_2$) and carbon monoxide (CO) as major constituents thereof, through said first reactor system, counter-current to the iron ore movement therein;
   holding iron ore within said first reactor with hot reducing gases passing thereover a sufficient time period so as to obtain up to a ninety-five percent (95%) metallization thereof;
   scrubbing the off-gas from said first reactor system to remove water and solids therefrom;
   converting carbon monoxide (CO) in said off-gas to carbon dioxide ($CO_2$);
   stripping carbon dioxide ($CO_2$) from said off-gas;
   heating said off-gas so as to provide a part of the endothermic heat of reduction required to metallize iron ore;
   passing said off-gas into a second pressurized fluidized bed ore reactor system that is like the first reactor system and contains a bed of iron like the iron ore bed of the first reactor system, said converted, stripped and heated off-gas flowing counter-currently to the ore movement, that ore movement controlled to provide metallizing to the same extent of iron ore therein as produced in the first reactor system;
   scrubbing the off-gas from said second reactor system to remove water and solids therefrom; and
   using beneficially said scrubbed off-gas from said second reactor system.

10. A method as recited in claim 9, wherein,
    the select size of iron ore is a mid-size ore from three eighths of an inch (9.53 mm) to two hundred mesh in diameter.

11. A method as recited in claim 9, wherein,
    the temperature of the iron ore entering the first and second reactor systems is in a range of temperatures from 1500° F. to 1700° F. (815° C. to 925° C.)

12. A method as recited in claim 9, wherein,
    the temperature of the reducing gas entering the first and second reactor system is in a range of temperatures from 1500° F. to 1700° F. (815° C. to 925° C.).

13. A method as recited in claim 9, further including the step of,
    passing the water with collected solids therein from scrubbing the off-gas from said first and second reactor systems to an iron ore separation facility for reprocessing therein.

14. A method as recited in claim 9, further including the steps of,
    heating the off-gas from the second reactor system to a temperature sufficient to provide a part of the endothermic heat of reduction required to metallize iron ore; and
    passing that heated off-gas to a third pressurized fluidized bed ore reactor system that is like the first and second reactor systems and contains a bed of iron ore like the bed of the first and second reactor systems, metallizing therein that iron ore to the same percentage of metallization as the product produced in said first and second reactor systems.

15. A method as recited in claim 14, further including the step of,
    scrubbing the off-gas from said third reactor system to remove water and solids therefrom; and
    using beneficially the scrubbed off-gas.

16. A method as recited in claim 15, wherein the beneficial use of said scrubbed off-gas from the third reactor system further includes the steps of,
    purging said off-gas to control inert gas buildup;
    compressing and heating said off-gas to the pressure and temperature of the reducing gas flow into the first reactor system; and
    passing said compressed and heated off-gas into the reducing gas flow into said first reactor system.

17. Direct reduction apparatus operating under pressure producing metallized iron ore from selected feed stock comprising, iron ore heater means for providing controlled heating of a select size of iron ore therein to dry that ore and to raise the temperature thereof sufficiently to supply thereto part of the endothermic heat of reduction required to metallize said ore in a downstream reactor;

means for pressurizing to the pressure of a first pressurized fluidized bed ore reactor system said dried and heated iron ore and moving said dried and heated iron ore to a first pressurized fluidized bed ore reactor system;

a first pressurized fluidized bed ore reactor system arranged to receive said dried and heated ore and consisting of a housing wherein is arranged an ore bed that moves counter-currently to a flow of reducing gas therethrough that opposite flow producing metallized iron ore as a product therefrom, the ore to reducing gas flow being at a rate such as to produce up to a ninety-five percent (95%) metallization of that ore;

(a flow of) reducing gas (at the) pressurized to the pressure of said first reactor system (pressure to) passed to said first reactor system consisting of hydrogen gas ($H_2$) and inerts, which reducing gas is heated appropriately to supply part of the endothermic heat of reduction required to metallize iron ore;

scrubber means for scrubbing off-gas from said first reactor system, removing water and solids therefrom;

means for heating said off-gas from said first reactor system to supply thereto part of the endothermic heat of reduction required to metallize iron ore;

a second pressurized fluidized bed ore reactor system like the described first reactor system, metallizing, to the same percentage, a bed of iron ore therein that is like the bed of the first reactor system, and is arranged to receive and pass counter-currently to the moving ore therein, inlet pressure of said second reactor system being that of said heated off-gas producing thereby metallized iron ore as a product therefrom;

scrubber means arranged to receive off-gas from said second reactor system for scrubbing that off-gas to remove water and solids therefrom; and means for beneficially using said scrubbed off-gas from said second system.

18. Direct reduction apparatus as recited in claim 17, wherein the ore heater means consists of, a housing containing two stages of fluidized mid-sized iron ore beds;

valve means for controlling flow of iron ore between said stages;

a fuel air mixture burned to pass hot gases through said stages, counter-current to said iron ore movement therein, that burning being at the stochiometric ratio to supply endothermic heat of reduction to said iron ore in said second stage, heating with sensible heat the iron ore in said first stage;

means for controlling the temperature of the iron ore in said first stage;

scrubber means for removing water and solids from the off-gas from said heater, which off-gas contains inert gases; and means for transporting and using said off-gas.

19. Direct reduction apparatus as recited in claim 18, wherein the means for controlling the temperature of the iron ore in said first stage consists of, a spray nozzle arranged to pass water therethrough onto iron ore in said heater first stage.

20. Direct reduction apparatus as recited in claim 17, wherein the first and second pressurized fluidized bed ore reactors each consists of, a housing containing two stages therein; and valve means for controlling ore flow between the stages, each stage maintaining a bed of iron ore therein and is arranged to pass the flow of reducing gas counter-currently therethrough.

21. Direct reduction apparatus as recited in claim 17, wherein the means for providing reducing gas consisting of hydrogen ($H_2$) and inerts to the first reactor system consists of, a source of reducing gas having hydrogen ($H_2$), carbon monoxide (CO) and carbon dioxide ($CO_2$) as constituents thereof;

shift conversion and stripping means receiving said reducing gas for converting carbon monoxide (CO) therein to carbon dioxide ($CO_2$) and for removing carbon dioxide ($CO_2$) therefrom leaving hydrogen gas ($H_2$) and inerts;

means for pressuring said hydrogen gas ($H_2$) and inerts to the pressure of the first reactor system;

means for heating said hydrogen gas ($H_2$) and inerts to provide thereto part of the endothermic heat of reduction required to metallize iron ore; and means for passing said heated and pressurized hydrogen gas ($H_2$) and inerts into said first reactor system.

22. Direct reduction apparatus as recited in claim 17, further including, a third pressurized fluidized bed reactor system like the first and second reactor systems containing a fluidized bed of iron ore that is like the iron ore beds in the first and second reactor systems and is arranged to receive and pass counter-current to the iron ore bed movement the off-gas from the second reactor system;

means for heating said off-gas from said second reactor system to supply part of the endothermic heat of reduction required to metallize iron ore thereto prior to its entry into said third reactor system; and scrubber means arranged to receive off-gas from said third reactor system for scrubbing that off-gas to remove water and solids therefrom.

23. Direct reduction apparatus as recited in claim 22, further including, a means for transporting and beneficially using said off-gas from the third reactor system consisting of, means for removing inert gases therefrom;

means for compressing and heating said off-gas to the pressure and temperature of the reducing gases entering the first reactor system; and transport means for passing said off-gas into the reducing gas flow entering said first reactor system.

24. Direct reduction apparatus as recited in claim 23, further including, means for transporting solids removed during scrubbing of the off-gas from said first, second, and third reactor systems to the source of iron ore feed stocks.

25. A method for metallizing select size of iron ore comprising the steps of, passing a select size of iron ore suitable for direct reduction in a first pressurized fluidized bed ore reactor system to such system, which ore has been heated so as to provide a part of the endothermic heat of reduction required to metallize that ore in said first reactor system;

passing a flow of reducing gas heated so as to provide a part of the endothermic heat of reduction required to metallize iron ore, having hydrogen gas ($H_2$) as a major constituent thereof, through said first reactor system, counter-current to the iron ore movement therein;

holding iron ore within said first reactor system with hot reducing gases passing thereover a sufficient time period so as to obtain up to a ninety-five percent (95%) metallization thereof;

scrubbing the off-gas from said first reactor system to remove water and solids therefrom;

heating said off-gas so as to provide a part of the endothermic heat of reduction required to metallize iron ore;

passing said off-gas into a second pressurized fluidized bed ore reactor system that is like the first reactor system, and contains a bed of iron ore like the bed of the first reactor system, said heated off-gas flowing counter-currently to the ore movement, that ore movement controlled to provide metallizing to the same extent of iron ore therein as produced in the first reactor system; scrubbing the off-gas from said second reactor system to remove water and solids therefrom; and using beneficially said scrubbed off-gas from said second reactor system.

26. A method as recited in claim 25 wherein, the select size of iron ore is a mid-size ore from three eighths of an inch (9.53 mm) to two hundred mesh in diameter.

27. A method as recited in claim 25, wherein, the temperature of the iron ore entering the first and second reactor systems is in a range of temperatures from 1500° F. to 1700° F. (815° C. to 926° C.).

28. A method as recited in claim 25, wherein the temperature of the reducing gas entering the first and second reactor systems is in a range of temperatures from 1500° F. to 1700° F. (815° C. to 925° C.).

29. A method as recited in claim 25, further including the steps of producing the flow of reducing gas by, to a gas containing hydrogen gas ($H_2$) and carbon monoxide (CO) as constituents thereof, converting carbon monoxide gas (CO) in said gas to carbon dioxide gas ($CO_2$); and stripping carbon dioxide gas ($CO_2$) from said converted gas, leaving hydrogen gas ($H_2$) and inerts therein.

30. A method as recited in claim 25, further including the step of, passing the water with collected solids therein from scrubbing the off-gas from said first and second reactor systems to an iron ore separation facility for reprocessing therein.

31. A method as recited in claim 25, further including the steps of, heating the off-gas from the second reactor system to a temperature sufficient to provide a part of the endothermic heat of reduction required to metallize iron ore; and passing that heated off-gas to a third pressurized fluidized bed ore reactor system that is like the first and second reactor systems and contains a bed of iron ore like the bed of the first and second reactor systems, metallizing therein that iron ore to the same percentage of metallization as the product produced in said first and second reactor systems.

32. A method as recited in claim 31, further including the step of, scrubbing the off-gas from said third reactor system to remove water and solids therefrom; and using beneficially the scrubbed off-gas.

33. A method as recited in claim 32, wherein the beneficial use of said scrubbed off-gas from the third reactor system further includes the steps of, purging said off-gas to control inert gas buildup;

compressing and heating said off-gas to the pressure and temperature of the reducing gas flow into the first reactor system; and passing said compressed and heated off-gas into the reducing gas flow into said first reactor system.

34. A method for post treating of a hot metallized product produced by direct reduction apparatus and methods for preventing reoxidation thereof including the steps of, in a fluidized bed apparatus, passing therethrough a flow of cold inert gases counter-current to movement of a fluidized bed of metallized iron ore therein, reducing thereby the temperature of the metallized iron ore;

spraying water over the bed of metallized iron ore, reducing thereby the temperature thereof to room temperature; and drying the cooled metallized iron ore.

* * * * *